3,062,660
TREATING RAW NUTMEATS
Justin J. Alikonis and Harold R. Hillman, Bloomington, and Charles L. Olson, Normal, Ill., assignors to Paul F. Beich Company, Bloomington, Ill., a corporation of Illinois
No Drawing. Filed June 24, 1960, Ser. No. 38,432
1 Claim. (Cl. 99—126)

This invention relates to improvements and innovations in roasting raw nutmeats with their skins on and the invention is especially useful in connection with roasting peanuts, either of the Spanish or Virginia varieties.

The art of roasting nuts or nutmeats is an old one. In commercial practice nutmeats, such as peanuts, may be roasted either batchwise or continuously. Furthermore, the nutmeats, such as peanuts, may be roasted dry or they may be roasted in oil. Dry roasted nuts are those processed either in batch or continuous equipment wherein the nutmeats are heated while being stirred or tumbled, using direct heat or forced or circulated hot air to bring the nutmeats to the desired temperature for the desired time to produce the roast desired. Oil roasted nuts are those processed in heated vegetable oil for a given time to remove moisture and produce the roast desired. As in dry roasting, batch and continuous oil roasters are known in the trade, the latter being more expensive but more efficient and attractive where the volume justifies the capital investment.

It is well known that when raw nutmeats with their skins on are either oil roasted or dry roasted, the skins loosen and flake off during and as a result of the roasting or cooking process. Furthermore when the roasted nutmeats are handled during the addition of salt, corn syrup, spices, flavors, etc., additional quantities of skins flake off. Subsequently, during packaging and handling incidental to shipment and storage, further flaking off of the skins occurs.

Some nutmeats are more subject to flaking off of skins than others. A classical example is the peanut either of the Spanish or Virginia varieties. In this country, the peanut is the most important commercial nut. When peanuts are roasted, the skins are loosened and the resulting product tends to be unsightly and have little sales appeal since some of the skins are on, some of them are off. The product is certainly not as attractive as it would be if all the skins were on or if all of them were off. Furthermore, because of the tendency of the skins to come off it is difficult to apply salt or flavors which will stay with the individual peanuts. Furthermore, the peanut skins in themselves have very little food value and tend to be bitter and unpalatable.

Heretofore, partial success in retaining skins on roasted peanuts has been achieved by using oil roasting equipment having several temperature zones of the heating oil. While this technique does aid somewhat in the retention of skins, it is far from satisfactory for the production of a good commercial product. All known techniques of adding stabilizers and syrups have been of little or no use in increased skin retention of peanuts or other nutmeats.

It was discovered in accordance with the present invention that by treating the raw nutmeats (as distinguished from the roasted nutmeats), with their skins on, with a prolamine or cereal protein, the most important commercial one being zein, and then roasting the nuts, the tendency of the skins to loosen and flake off, was very materially reduced. The zein or other prolamine can be easily applied to the raw nuts in the form of a solution wherein the solvent is a non-toxic, evaporable solvent. Zein and other prolamines are characterized by being insoluble in water alone but soluble in alcoholic solutions, e.g. 80%–90% alcohol. Preferably, the zein or other prolamine, in addition to being dissolved is plasticized with an edible plasticizer such as one of the fatty acids (single or mixed), acetylated monoglycerides, mono and/or diglycerides, or other edible plasticizing materials compatible with zein or other prolamine. The solvent should be a co-solvent for the prolamine and plasticizer.

The use of zein, and solutions of plasticized zein in alcohol, to treat confections, including roasted nuts, is old and described in Patent 2,791,509 to Cosler, and the treating materials specifically and generally disclosed therein, may be used in practicing the present invention. However, according to Cosler the nuts treated with his zein solutions were invariably roasted and the purpose of treating the roasted nuts or other confections with the zein solutions was to impart to them an attractive, decorative finish which acts as an efficient oil and moisture barrier. Certain other desirable effects were mentioned by Cosler depending upon the type of confection that was treated, but there was no indication that the zein films or coatings in any way contributed to the retention of skins on roasted nutmeats. And, as a matter of fact the zein films do not make a noticeable contribution in this respect when they are applied to roasted nutmeats as distinguished from raw nutmeats.

Accordingly, the object of the present invention, generally stated, is the provision of a method whereby the skins can be caused to adhere and remain intact on nutmeats, notably peanuts, which method involves treating the nutmeats or peanuts in their raw state with a solution of zein or other prolamine, suitably plasticized, and then roasting the nuts with the zein films or coatings in place.

When the raw nuts are treated with solutions of zein or comparable prolamines in accordance with the present invention, prior to roasting, so that the skins are retained on the nuts to a substantially greater degree than normal, certain other improvements or benefits have been noted. Thus, the skins are rendered nutritive by the addition of the zein or other edible cereal protein. Furthermore, the palatability of the skins is enhanced and the keeping qualities of the roasted nutmeats are materially improved. Hence, the provision of roasted nuts having improved appearance, palatability, and resistance to rancidity and sogginess is a general object of the invention.

Certain other objects of the invention will, in part, be obvious, and will in part appear hereinafter.

For a more complete understanding of the nature and scope of the invention, reference may now be had to the following detailed description thereof wherein a number of illustrative examples are set forth so as to instruct those skilled in the art as to how the invention may be practiced and to suggest variations and other embodiments of the invention.

In general, any raw nutmeats which have skins may be treated in accordance with this invention including, in addition to peanuts, almonds, filberts, etc.

The treating solutions contain three main components as follows: (1) a prolamine, preferably zein; (2) an edible plasticizer, preferably selected from the class consisting of fatty acids (single or mixed), acetylated monoglycerides, and mono and diglycerides of edible fats (single or mixed); and (3) a volatile solvent, such as anhydrous to 90% ethyl alcohol, 90% isopropyl alcohol, and low molecular weight glycols and glycol ethers. Special solvents such as "Permit Formula 35a" denatured alcohol containing 5 parts by volume of ethyl acetate to 100 parts of ethyl alcohol may be used. In addition to these components other agents and materials may be included for greater elegance such as various anti-oxidants, flavoring materials, coloring materials, etc. Quantitatively, the main constituent of the treating or coating solutions is usually the volatile solvent or carrier, e.g. specially denatured ethyl alcohol 90%; the second main component in the order of concentration will be the zein or other prolamine; and, the third main ingredient in the order of magnitude will usually be the edible plasticizer. Any additional ingredients will usually be present in smaller amounts.

When raw nutmeats treated or surface coated with a zein solution in accordance with the present invention are roasted, the oil from the nutmeats themselves when they are dry roasted, or the vegetable oil in which the nutmeats are roasted when this process is used, aids in plasticizing the zein coating that is being roasted on the nutmeats. The end result is a continuous, adherent protective film coating on each nutmeat which in addition to keeping the skins in place also protects the nutmeats from oxidative rancidity and from sogginess due to high humidity.

It has been found that a zein or other prolamine coating, dry basis weight (i.e. solvent not included), of at least 0.5% by weight of the nutmeats, is necessary to show an appreciable affect according to the present invent. Preferably, about 1% by weight of the zein coating (solvent not included) is used since this concentration gives excellent results. While larger amounts or proportions of the coatings to the nutmeats may be used, such as 1.5%, and will give thicker surface films or coatings, such increased amounts are not considered necessary for the purpose of the invention unless there is a requirement for purpose of texture and flavor. In other words, the skin retention effect does not seem to be materially enhanced by increasing the amount of zein coating above 1% by weight on the basis of the nutmeats. Preferably, the plasticizer component will equal 10 to 50% of the total solids of the coating solutions.

The treating or coating solution comprising zein or other prolamine, plasticizer, and any other ingredient which may be included such as anti-oxidant, dissolved in the non-toxic evaporable mutual organic solvent for the zein and plasticizer, may be applied to the raw, unroasted nuts in several practical ways. For example, the raw nuts may be placed in a revolving pan of the type well known in the confectionery industry, and the treating or coating solution may be sprayed onto the nuts as the pan revolves. Or the proper amount of solution may be simply poured into the revolving pan and the coating action obtained as the nuts tumble the pan. Alternatively, the treating solution or coating solution may be sprayed onto the nuts as they are conveyed on a moving belt.

The evaporable solvent should be removed from the raw, unroasted nuts before they are subjected to further treatment, which usually will be roasting. Since the amounts of treating solution are small in comparison with the quantities of nuts treated, e.g. 1.3 ounces of treating solution to from 3–8 pounds of nuts, the volatile solvent is readily removed. For example, continued rotation of a revolving pan while open to the atmosphere will result in adequate drying but this can be materially hastened by using a fan to blow air into the drum or onto a moving belt.

In each of the following examples the raw peanuts are treated, as indicated, with one of the two following zein solutions:

NO. 1

63.5% alcohol 35A (90%)
28.0% zein
6.85% acetylated monoglycerides
0.54% citric acid
0.23% butylated hydroxyanisole
0.07% propyl gallate
0.81% propylene glycol

NO. 2

65.16% alcohol 35A (90%)
27.5% zein
5.0% stearic acid
2.0% oleic acid
0.17% butylated hydroxyanisole
0.17% butylated hydroxytoluene In each example one of these two zein solutions was poured onto the raw nuts, in the proportions indicated, while the nuts were tumbling in a revolving pan. After blending about five minutes, the nuts were fan dried to remove solvent.

*Example 1*

Raw peanuts treated with Coating No. 1 at rate of 1.328 oz. (1% on dry basis) to 3# nuts.
Treated nuts oil roasted in coconut oil at 335 to 340° F.
Cooked corn syrup (230° F.) with lecithin added in revolving pan at rate of 2 fl. oz. syrup to 3# roasted nuts.
Nuts transferred to tray and a salt-sugar mixture stirred in at rate of 1 oz. salt and 1 oz. sugar to 3# nuts.
Finishing oil added at rate of 1 oz. peanut oil to 3# nuts.

*Example 2*

Raw peanuts treated with Coating No. 1 at rate of 1.328 oz. (1% on dry basis) to 3# nuts.
Treated nuts oil roasted in coconut oil at 335 to 340° F.
Cooked corn syrup (230° F.) added in revolving pan at rate of 2 fl. oz. syrup to 3# roasted nuts.
Nuts transferred to tray and a salt-sugar mixture stirred in at rate of 1 oz. salt and 1 oz. sugar to 3# nuts.
Finishing oil with antioxidant added at rate of 1 oz. peanut oil (with antioxidant) to 3# nuts.

*Example 3*

Raw Virginia peanuts coated with 1% (dry basis) Coating No. 2 then roasted in oil at 340° F.
Peanuts allowed to cool, then peanut oil applied at rate of ½ fl. oz. per 1# of peanuts and mixed.
A 50–50 mixture of salt and sugar sprinkled on at the rate of 1 oz. salt and 1 oz. sugar for 3# nuts and mixed.
Finally a finishing oil consisting of peanut oil (with antioxidant) added at rate of 1 oz. for 3# nuts.

It will be understood that the foregoing examples are illustrative and that variations may be made therein. Thus, peanuts may be replaced by almonds and filberts. In the zein treating solutions, the zein may be replaced with another prolamine, e.g. gliadin (from wheat) a hordein (from barley), or kafirin (from kafir corn); the glycerides replaced with fatty acids such as food grade palmitic and stearic acids; and, the specially denatured alcohol 35A with 90% isopropyl alcohol, or low molecular weight glycols and glycol ethers.

Since certain other changes and modifications in procedure and formulations may be made without departing from the spirit and scope of the invention, the foregoing examples are intended to be interpreted as illustrative and not in a limited sense.

We claim:

The improvement in roasting peanuts with their skins on which comprises coating the raw peanuts with a minor quantity of an alcoholic solution of zein plasticized with a plasticizer of the group consisting of fatty acids, mono and diglycerides of edible fatty acids, and, acetylated monoglycerides, a sufficient quantity of said solution being applied to said raw peanuts with their skins on so as to deposit thereon a plasticized zein coating in an amount equal to at least about 0.5% by weight of said peanuts.

References Cited in the file of this patent
UNITED STATES PATENTS

| | | |
|---|---|---|
| 1,546,606 | Pape | July 21, 1925 |
| 2,791,509 | Cosler | May 7, 1957 |
| 2,813,029 | Shirk | Nov. 12, 1957 |
| 2,859,121 | Avera | Nov. 4, 1958 |